United States Patent
Molnar et al.

[11] Patent Number: 5,490,351
[45] Date of Patent: *Feb. 13, 1996

[54] LOW COST SOD MAT AND METHOD FOR PROPAGATION

[75] Inventors: Charles J. Molnar; Judith R. Molnar, both of 12 Malvern Ct., Wilmington, Del. 19810

[73] Assignees: Charles J. Molnar; Judith R. Molnar, both of Wilmington, Del.

[*] Notice: The portion of the term of this patent shall not extend beyond the expiration date of Pat. No. 5,345,713.

[21] Appl. No.: 304,699

[22] Filed: Sep. 12, 1994

Related U.S. Application Data

[63] Continuation of Ser. No. 34,231, Mar. 22, 1993, Pat. No. 5,345,713, which is a continuation-in-part of Ser. No. 745,224, Aug. 14, 1991, abandoned.

[51] Int. Cl.$^6$ ............................................. A01C 1/04
[52] U.S. Cl. .............................................. 47/56; 47/9
[58] Field of Search ........................................... 47/56, 95

[56] References Cited

U.S. PATENT DOCUMENTS

| | | |
|---|---|---|
| 3,516,196 | 6/1970 | Lippoldt . |
| 3,557,491 | 1/1971 | Franklin et al. . |
| 3,863,388 | 2/1975 | Loads . |
| 3,890,739 | 6/1975 | Blackburn . |
| 3,914,901 | 8/1975 | Muldner . |
| 4,023,506 | 5/1977 | Robey . |
| 4,190,981 | 3/1980 | Muldner . |
| 4,336,668 | 6/1982 | Decker . |
| 4,342,807 | 8/1982 | Raser et al. . |
| 4,539,038 | 9/1985 | Gombert . |
| 4,584,790 | 4/1986 | Gaugher . |
| 4,786,550 | 11/1988 | McFarland et al. . |
| 4,934,094 | 6/1990 | Walton . |
| 4,941,282 | 7/1990 | Milstein . |
| 4,986,026 | 1/1991 | Decker . |
| 5,189,833 | 3/1993 | Clark . |
| 5,205,068 | 4/1993 | Solomon . |
| 5,224,290 | 7/1993 | Molnar et al. . |
| 5,224,292 | 7/1993 | Anton . |
| 5,301,466 | 4/1994 | Egan . |
| 5,344,470 | 9/1994 | Molnar et al. . |
| 5,345,713 | 9/1994 | Molnar et al. . |
| 5,346,514 | 9/1994 | Molnar et al . |

OTHER PUBLICATIONS

Proceedings of the International Plant Propagators Society vol. 25, 1975, pp. 408–412 "Groundcover Sods . . . " by Sterret et al.

Cooperatives Extension Service, Univ. of De, 1974 "Sod Production with Plastic Netting" by Mitchell et al.

Organic Gardening, Sep. Oct. 1990, pp. 47–49 "Something Wild" by Jeff Cox.

Hortscience, 18(1), pp. 89–91, 1983 "Developing Wildflower Sods" by Airhart et al.

*Primary Examiner*—Terry Lee Melius
*Assistant Examiner*—Joanne C. Downs

[57] ABSTRACT

A new and improved herb, vegetable, flower, and groundcover sod mat suitable for many landscape applications. The improvement comprises growing either plant seeds, seedlings, plant plugs, rooted cuttings, or root divisions in a planting medium so that the roots of the plant material entangle with a polyolefin sod reinforcement to form a tough, lightweight, flexible sod mat. The sod mat can be produced in many strengths and weights, with many diverse planting mediums, with multiple species of plants. The polyolefin sod reinforcement can contain prodegradants which promote environmental friendliness. Sod mat may be sold in rolls or rectangular mat.

23 Claims, 6 Drawing Sheets

LOW COST SOD MAT AND METHOD FOR PROPAGATION

This is a continuing application of Ser. No. 08/034231 filed on Mar. 22, 1993 which was inturn a continuation in part of application Ser. No. 07/745224 filed on Aug. 14, 1991. Application Ser. Nos. 08/034231 and 07/745224 are included herein by reference.

FIELD OF INVENTION

This invention relates to a new and versatile herb, vegetable, flower, and groundcover sod mat for many landscaping or home gardening applications.

BACKGROUND—DESCRIPTION OF PRIOR ART

Sod mats have long been used in the landscaping industry. Reinforced flower and groundcover sod mats were tested in the 1970's. These sod mats have serious commercial limitations for the grower, landscaper, or consumer. Some also have environmental limitations.

Many flower and grass sod mats contain ungerminated seeds. Germination and early seedling growth requires adequate rainfall and good soil temperature. In addition, the type of soil is often problematic. Also, many of these seed sod mats require complex, expensive, and specialized equipment which makes producing small custom lots difficult and expensive for small landscape jobs. Many of these use moisture sensitive glues or other ingredients which may lead to storage or shipping instabilities or even premature germination. In addition, some are based on a synthetic hydrophobic polymer which then needs hydrophilic materials added to encourage germination and good growth. These hydrophilic materials are often superabsorbent hydrogels which are expensive to produce and to use.

Flower and sod mats grown on a very open plastic netting for sod reinforcement are difficult to completely cover with thin planting mediums, use significant synthetic material per square meter, and often have delayed harvest times due to the open structure. Plastic netting which is less open often damages the seedling roots by girdling them.

Flower sod mats grown on REEMAY® polyester spunbond fabrics are limited because the polyester is neither ultraviolet light degradable nor biodegradable, synthetic plastic consumption per square acre is often higher than needed, and only a limited range of strengths are suitable for good commercial sod mat production. Very low weight polyester spunbond fabrics are not generally commercially available. Higher polyester spunbond fabric weights and strengths retard seedling root penetration. For these reasons, the type of planting medium, planting medium weight, and planting depth are limited for best commercial production. Polyester spunbond fabrics are also moderately expensive.

It is often convenient to subdivide sod mats by hand in the field prior to installation. Some reinforced sod mats, even in light weights, have structures which when torn, also cause significant tearing of the plant root structure. Some other sod mats containing higher strength sod mat reinforcements are difficult to cut even with a knife.

In addition, many of these seed and sod mats are designed to use only first quality grade products to produce seed or sod mats for the landscaper and consumer. This requires the use of more expensive ingredients and in general, increases the general cost to society of these sod mats.

Thus, sod mats heretofore known suffer from a number of disadvantages:

a) Their manufacture requires expensive, complex equipment. Often this equipment by its nature prevents optimum flower or groundcover production for small landscapers and/or customers.

b) Sod mats containing seeds only prevent economical production of sod mats of many herb, vegetable, flower, and groundcover species which are better propagated by cuttings, plant plugs, seedlings or plant divisions and the like.

c) Sod mats limited to seeds require control of environmental conditions such as moisture for the best germination. This leads to extra dollar, time and convenience expense for the landscaper or customer (if water is available).

d) Many sod mats are sensitive to moisture and humidity and may prematurely delaminate, decompose, germinate, or fall victim to fungus, diseases, or insects.

e) Sod mats and seed mats often contain more synthetic plastic than necessary for reinforcement of the specific flower sod because of limitations in availability of the reinforcement. Others use multiple layers of synthetic materials or other synthetic additives such as hydrogels.

f) Some sod mat reinforcements can only be used in lower strength ranges for good production of seed mats. This limits the species of plant materials which can be economically grown and the general applicability of the resulting sod mat.

g) Some sod mats are difficult to divide by hand, while others contain reinforcements with enough strength to damage sensitive roots during this subdivision process.

h) Current commercial REEMAY® polyester sod mat reinforcement will not decompose if exposed to sunlight due to heavy traffic or rain fall and the like, forcing the contractor and/or customer to cut away and clean up the unsightly portions if this occurs.

i) Many seed and sod mats are specifically engineered in a way that requires first quality sod mat reinforcements and thus cannot easily use second quality waste products to reduce the cost to society (and the consumer).

j) Traditional vegetable, herb, groundcover, and bedding plants are sold in pots and flats, which consume valuable natural resources for packaging and further add to society's refuse problem.

k) Traditional plant pots and flats are required by the grower in many styles and sizes for herbs, vegetables, flowers, and groundcovers at considerable expense to the grower for inventory, storage, handling, and disposal costs.

l) Some sod mat reinforcements are more expensive because of the type of synthetic resin used.

OBJECTS AND ADVANTAGES

Accordingly, objects and advantages of the present invention are:

a) to provide a method of producing sod mats which does not require expensive, complex equipment and which can easily produce small custom lots meeting customers' needs;

b) to provide a sod mat which can easily use optimum propagation techniques for the herb, vegetable, flower, groundcover or plant species desired;

c) to provide a sod mat containing viable, healthy seedlings, plant plugs, root divisions, or rooted cuttings with well-developed roots for immediate planting;

d) to provide a sod mat which will not decompose when exposed to high humidity or moisture and thus gives excellent storage and shipping characteristics;

e) to provide a sod mat with the minimum necessary synthetic plastic reinforcement to both conserve natural resources and minimize synthetic plastic addition to our landscapes;

f) to provide a sod mat reinforcement which contains maximum flexibility in reinforcement strength and hence, maximum utility for many plant species and applications;

g) to provide a sod mat which can easily be subdivided by hand and yet has substantial and useful strength before subdivision and at the same time minimizes root damage during this subdivision process;

h) to provide a sod mat reinforcement which will decompose if uncovered and exposed to sunlight by some accident;

i) to provide the grower with a sod mat construction which can efficiently use second quality sod mat reinforcements to produce a high quality sod mat for the landscaper and consumer while reducing the cost to the consumer and to society;

j) to provide a flower or groundcover product which dramatically reduces the need for traditional packaging and hence, reduces the refuse problem and reduces production costs;

k) to provide the grower with a flexible sod mat system of packaging retail sales which reduces his inventory, storage, and handling costs while also reducing the complexity of his inventory needs.

l) to provide the grower and consumer with a very low priced synthetic resin for sod mat reinforcement.

BRIEF DESCRIPTION OF DRAWING FIGURES

A brief description of the figures and reference numerals follows.

REFERENCE NUMERALS IN DRAWINGS

Figure 1:
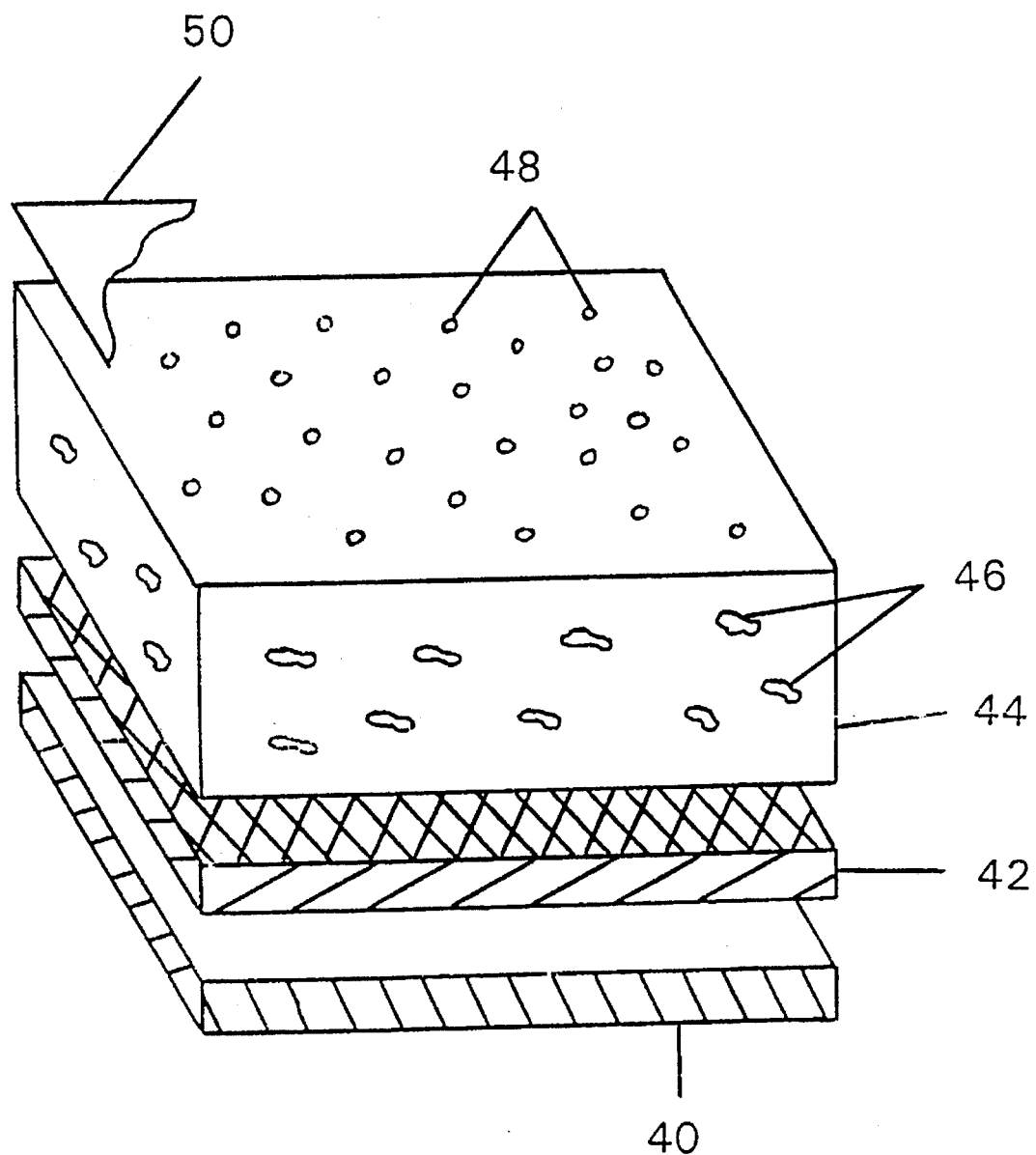
FIG. 1 is a simplified perspective view of newly planted flower sod mat.

40 Surface the sod mat is growing on (usually plastic film)
42 Polypropylene or polyolefin sod reinforcement
43 Polyester sod reinforcement
44 Planting medium
46 Woodchips
48 Seeds, plant plugs, seedlings, root divisions, or rooted cuttings
50 Crop cover
52 Mature seedlings, plant plugs, root division, or rooted cutting plant roots
54 Seedling, plant plug, root division, or rooted cutting plant roots
58 Polypropylene or polyolefin fibers
59 Polyester fibers
60 Bonded fiber region
62 Nonbonded fiber region
64 X-direction
66 Y-direction
68 Z-direction
70 Prepare appropriate flat for planting.
72 Install polypropylene or polyolefin sod reinforcement.
74 Install planting medium.
76 Add seeds, seedlings, plant plugs, root divisions, or rooted cuttings to medium.
78 Keep moist and fertilize. Allow to mature into a sod in 2–12 months.
80 Harvest.
82 Prepare field for weed guard and lay down plastic film weed guard.
84 Install bed edging.

SUMMARY OF THE INVENTION

Our invention is a new and improved plant sod mat comprising a polyolefin sod reinforcement wherein said polyolefin sod reinforcement comprises a pattern bonded polyolefin nonwoven fabric and a layer of planting medium on said polyolefin sod reinforcement and containing viable plants growing in said planting medium and whose roots penetrate and entangle with said polyolefin sod reinforcement and thus, form a sod mat. Said pattern bonded, polyolefin nonwoven fabric has a preferable basis weight of less than or equal to about 3 opsy and more preferably a basis weight of less than or equal to about 1.5 opsy and even more preferably a basis weight of less than or equal to about 0.8 opsy and most preferably a basis weight of less than or equal to about 0.3 opsy. Preferable pattern bonded, polyolefin nonwoven fabrics are pattern bonded, polyolefin spunbonded fabrics and pattern bonded, dry laid fabrics. Preferable polyolefin chemistries are polypropylene and polyethylene. Preferable plants are garden plants and even more preferable are ornamental plants.

A preferred embodiment of our invention is a new, improved plant sod mat comprising a polypropylene sod reinforcement wherein said polypropylene sod reinforcement is a pattern bonded, polypropylene spunbond fabric of less than or equal to 3.0 ounces per square yard and a layer of planting medium on said polypropylene sod reinforcement and containing viable herb, vegetable, flower, or groundcover seedlings, rooted cuttings, root divisions or plant plugs growing in said planting medium and whose roots penetrate and entangle with said polypropylene sod reinforcement and thus, form a sod mat. Based on our discovery, we have by figures, explanation, and example shown why polypropylene sod reinforcements are so effective in producing these new, diverse, and valuable herb, vegetable, flower, and groundcover sod mats. We have also disclosed how to design and produce the most preferable herb, vegetable, flower, and groundcover sod mats.

DESCRIPTION OF PREFERRED EMBODIMENTS—FIGS. 1–3

While the invention is described in connection with preferred embodiments, it is to be understood that the invention is not limited to those embodiments. For example FIGS. 1–6 specifically refer to a particular preferred polyolefin chemistry which is polypropylene. It is to be understood that other polyolefin chemistries are also highly functional. Thus all alternatives, modifications, and equivalents as can be included within the scope and spirit of the invention defined in the appended claims are intended to be covered.

FIG. 1 is a fragmentary cross section of a typical flower sod mat according to this invention. Reference Numeral 40 is a suitable surface on which to grow sod mats such as 4 mil black polyethylene film mulch or a porous polyethylene sheet such as VISPORE® manufactured by Tredigar in Richmond, Va. Other suitable surfaces include plywood, rubber sheeting or a concrete slab. In a field grown application the sod mat growing surface needs to prevent weeds from growing into and through the flower or plant sod mat from the soil below and also to encourage the flower roots to grow laterally and form a sod. In a flat grown application, the thin plastic film can serve to contain the roots and planting medium (Reference Numeral 44) in a flat with a very open bottom and also to make sod mat removal easier at harvest time. Reference Numeral 42 represents the polyolefin sod reinforcement. The polyolefin sod reinforcement is a pattern bonded, polyolefin nonwoven fabric. A preferable example is a polypropylene sod reinforcement consisting of a polypropylene spunbond fabric such as CELESTRA® marketed by Fiberweb North America Inc. in Greenville, S.C. or ACCORD® marketed by Kimberly-Clark in Neehah, Wis. Reference Numeral 44 is the planting medium. The planting medium is adjusted to the optimum depth for the herb, vegetable, groundcover, flower, or plant species of sod mat being grown. FAIRGROW® is a good growing medium manufactured by Delaware Solid Waste Authority in Wilmington, Del. Reference Numeral 46 represents the demolition woodchips manufactured by Corrado American in Wilmington, Del. which can be added to the planting medium (Reference Numeral 44). Other planting medium amendments are also effective such as PERLITE®, straw, hay, vermiculite, and are well known to those skilled in the art. Many other planting mediums can also be used. Examples include but are not limited to potting soil, METRO-MIX® and REDI-EARTH® manufactured by W. R. Grace. Reference Numeral 48 represents the seeds, seedlings, plant plugs, rooted cuttings, or root divisions added to the planting medium (Reference Numeral 44). Reference Numeral 48 also represents other means of starting plants where appropriate, such as cuttings and viable plant material derived from various types of plant tissue culture and thus are meant to be included in the seeds, seedlings, plant plugs, rooted cuttings, and root divisions definition above. Seedlings are usually planted in a 10–20 cm grid pattern. Thus various means to start plants are often referred to as plant starting materials in this specification and are well known to those of ordinary skill in the art (Reference Numeral 48). Reference Numeral 50 represents an optional crop cover such as REEMAY®2006 manufactured by Reemay, Inc., in Old Hickory, Tenn. This can serve to warm the soil up quickly in the spring and/or for some protection from marauding animals such as rabbits or birds.

Figure 2:
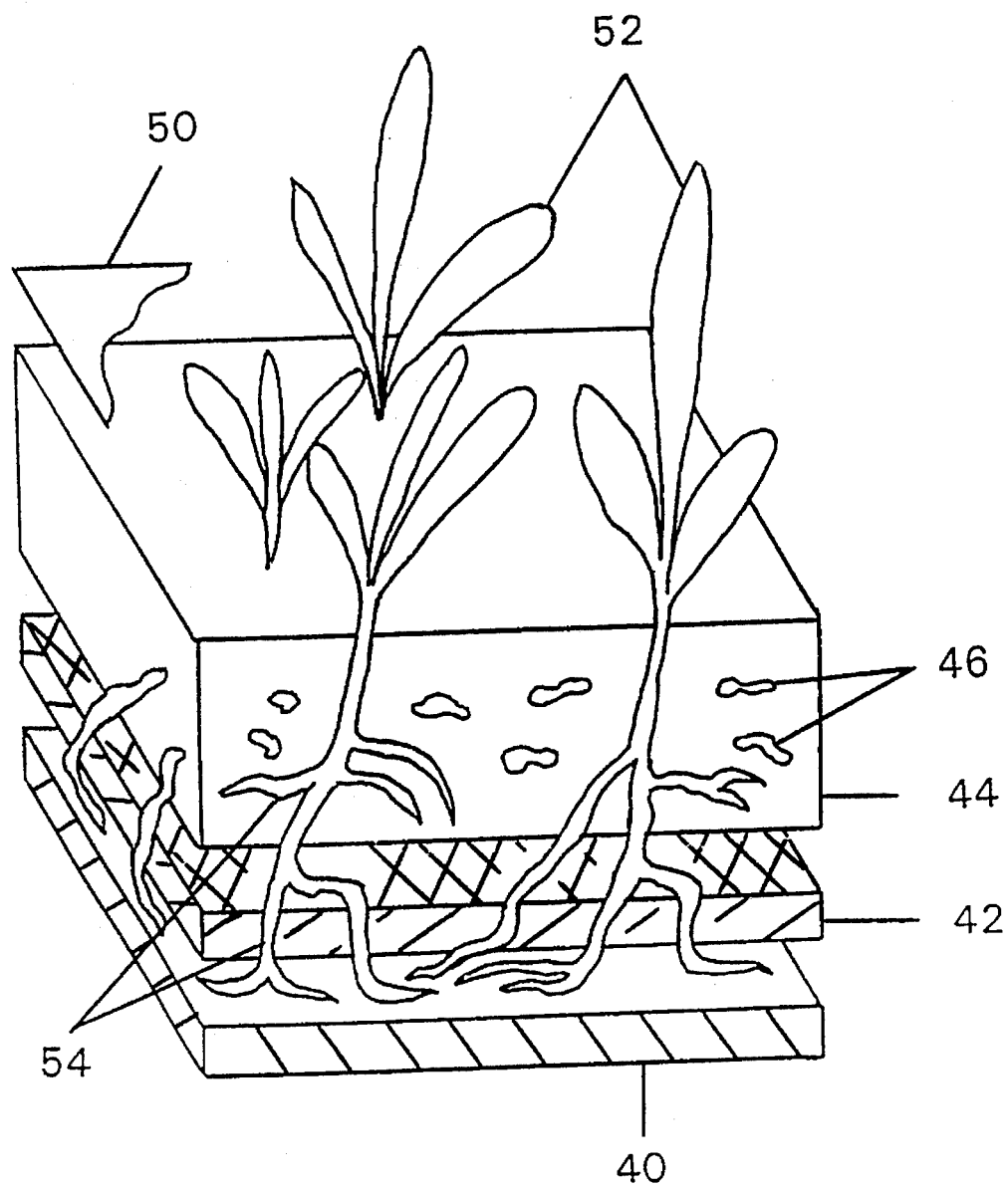
FIG. 2 is a simplified perspective of a seedling sod mat ready for harvest.

FIG. 2 is a fragmentary cross section of a mature sod mat according to this invention. Reference Numeral 44 is the planting medium. Reference Numeral 40 is a suitable surface on which to grow sod mats. Reference Numeral 42 represents the polyolefin sod reinforcement. The polyolefin sod reinforcement is a pattern bonded, polyolefin nonwoven fabric. A preferable example is a polypropylene sod reinforcement. Reference Numeral 52 depicts the plant seedlings, root divisions, rooted cuttings, or plant plugs in the planting medium (Reference Numeral 44) ready for harvest. A preferred class of plants is nutritional plants which is comprised of herbs and vegetables. Some representative examples of nutritional plants are cherry tomatoes and thyme. Another preferred class of plants is ornamental plants which is comprised of flowers and groundcovers. Some representative examples of ornamental plants include liriope spicata, bedding plants, wildflowers, and hostas. A particularly preferred class of plants is garden plants which is comprised of both nutritional and ornamental plants. Another preferred class of plants is grasses. Specialty grasses is a preferred class of grasses which is comprised of bunch grasses and shade grasses. Tall fescue grasses and perennial rye grasses are representative examples of bunch grasses. Reference Numeral 54 depicts the roots of the seedlings, root divisions, rooted cuttings, or plant plugs penetrating and entangled to each other and to polypropylene sod reinforcement (Reference Numeral 42) and the planting medium (Reference Numeral 44). It is this root penetration and entanglement which makes these sod mats very tough and easy to handle. Reference Numeral 50 is an optional crop cover such as hay for over winter protection.

We have discovered that the polyolefin sod reinforcement must permit easy penetration of the root structure and also must have enough tear strength in combination with the root entanglement and reinforcement to permit easy handling of the sod mat without tearing. This is no small task, since the sod weights can vary significantly. For instance, liriope spicata generally prefers a 5 cm depth of planting medium. Wildflower mixes usually are grown at a 2.5 cm depth. In addition, different growers, because of availability, price, and plant species, prefer different planting mediums such as potting soil, humus/wood chip mixture, sphagnum moss and PERLITE® mixture, or other commercially prepared planting mediums such as REDI-EARTH® or METRO-MIX®. Each of these planting mediums have different dry densities, they pick up different amounts of water and hence planting medium weights vary by a factor of two or three or more. In addition, it is common to pin sods on slopes greater than 10–20 degrees to prevent the sod from washing down before rooting with the subsoil is complete. Pinning adds an additional stress to the sod reinforcement. In addition to the physical weights, required strengths are also affected by how customers handle the sod mat—some gently and some roughly.

Thus, sod mat reinforcements from very light weights (and low tear strengths) to relatively heavy weights (and high tear strengths) are required for the many different types of customers and customer applications. At very light fabric weights (and strengths), the sod mats should be easily divisible by hand and this division should cause a minimum amount of root damage. We have discovered that polyolefin sod reinforcements make excellent sod reinforcements wherein said polyolefin sod reinforcement is a pattern bonded, polyolefin nonwoven fabric. Pattern bonded, polyolefin nonwoven fabrics and preferably, pattern bonded, polypropylene spunbond fabrics are excellent for these applications because they offer exceptional reinforcement flexibility, are easily divisible by hand, and have excellent root penetration and entanglement. ACCORD® is an example of a pattern bonded, polypropylene spunbond fabric. CELESTRA® is another example. Pattern bonding means that only localized regions of the nonwoven fabric and preferably spunbond fabric are bonded and the remaining nonbonded fiber regions contain polyolefin or polypropylene fibers which can move, entangle and otherwise promote excellent seedling root entanglement to form sod mats often much stronger than the polyolefin or polypropylene sod reinforcement itself. Those skilled in the art sometimes employ light tacking of the fibers in the nonbonded area to facilitate manufacture and handling of the pattern bonded, polyolefin nonwoven fabric (for example see Kirk Othmer Encyclopedia of Chemical Technology referenced below). These lightly tacked fiber regions are considered to be nonbonded fiber regions since they retain many properties similar to the nonbonded fiber regions. The area ratio of the nonbonded fiber region (Reference Numeral 62 in FIG. 3) to the bonded fiber region (Reference Numeral 60 in FIG. 3) is the nonbonded fiber region's surface area in square centimeters divided by the bonded fiber region's surface area in square centimeters. For example, if a particular pattern bonded, polypropylene spunbond fabric has a total area of 50 square centimeters of which the surface area of the nonbonded fiber region (Reference Numeral 62) is 40 square centimeters and the surface area of the bonded fiber region (Reference Numeral 60) is 10 square centimeters, then the area ratio of nonbonded fiber region to the bonded fiber region is 4/1.

Pattern bonded polyolefin nonwoven fabrics make good sod reinforcements at both high and low tear strengths. Pattern bonded polyolefin nonwoven fabrics function well at both surprising low tear strengths and high tear strengths. Pattern bonded, polyolefin nonwoven fabrics can be manufactured by a number of manufacturing processes well known to those skilled in the art. Representative examples are dry laid nonwoven fabrics and spunbond fabrics and public references are well known. Preferred polyolefin chemistries include both polypropylene and polyethylene chemistry. Linear low density polyethylene is a particularly preferred polyethylene. Other preferred polyethylenes are copolymers of polyethylene and higher alpha-olefins having 4 to 18 carbon atoms. A well known reference is the Kirk-Othmer Encyclopedia of Chemical Technology published by John Wiley and Sons, London/New York, Vol. 16, 3rd Edition, 1978, pages 72–124. Some illustrative examples in the United States patent literature are U.S. Pat. No. 5,108,820 to Kaneko et al., U.S. Pat. No. 5,068,141 to Kubo, U.S. Pat. No. 5,033,172 to Harrington et al, U.S. Pat. No. 4,753,834 to Braun et al., U.S. Pat. No. 4,535,013 to Kuhn, and U.S. Pat. No. 4,451,315 to Miyazaki. These references are not meant to limit nonwoven fabrics or technologies useful in this invention, but only to serve as helpful guidance to those skilled in the art. Suitable nonwoven fabrics are readily available commercially. Some representative examples of suitable commercial nonwoven fabrics to use as polyolefin sod reinforcements are included in Table 1 below.

TABLE 1

Representative Examples of Pattern Bonded, Polyolefin Nonwoven Fabrics and some representative properties.

| Product | Fabric Weight (opsy) | Grab Tensile Strength (md) (lb/in) | Grab Tensile Strength (td) (lb/in) | Air Permeability (cfm/ft$^2$) |
|---|---|---|---|---|
| ACCORD ® 104 | 0.4 | 6.0 | 5.8 | 840 |
| ACCORD ® 108 | 0.8 | 10 | 13 | 450 |
| LUTRASIL ® 6710 | 0.3 | 7.0 | 5.6 | >1000 | where:

opsy=ounces per square yard md=machine direction td=transverse direction cfm/ft$^2$=cubic feet per minute per square foot Grab tensile strength: Test Method ASTM D-1682-64

Air Permeability: Test Method ASTM D-737-75 at 0.5 inch of water.

ACCORD® spunbond fabric is manufactured and sold by Kimberly-Clark.

LUTRASIL® spunbond fabric is manufactured and sold by Freudenberg Spunweb Co.

Pattern bonded polypropylene spunbond fabrics, one of the preferred examples of a polyolefin sod reinforcement, function well as a polypropylene sod reinforcement (Reference Numeral 42) at both surprisingly low tear strengths and high tear strengths. Additional advantages include excellent porosity and a good fiber elongation which promotes quick, excellent root penetration. In combination, these characteristics lead to excellent sod mat production.

Figure 3:
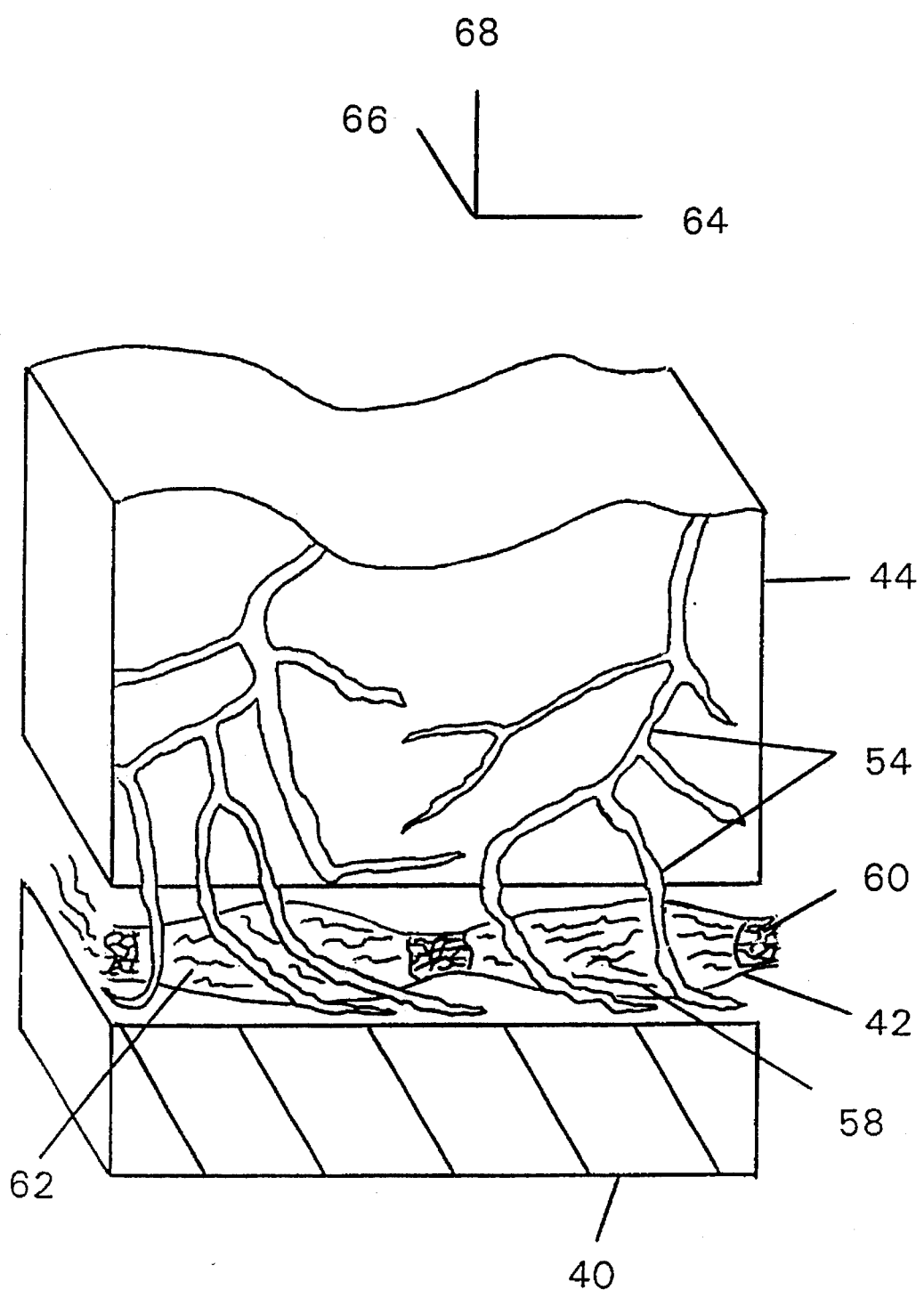
FIG. 3 is an artist's conception of the root penetration in the pattern bonded polypropylene nonwoven fabric.

FIG. 3 is an artist's conception of the root penetration in pattern bonded polypropylene spunbond fabrics. It is our belief that most of the roots (Reference Numeral 54) penetrate the polypropylene sod reinforcement (Reference Numeral 42) in the nonbonded fiber regions (Reference Numeral 62) and that few roots, if any, penetrate in the bonded fiber regions (Reference Numeral 60). In addition, in the nonbonded fiber regions, since the roots can grow between, and entangle individual fibers in a random fashion in all directions (Reference Numerals 64, 66, and 68), the young seedlings tend to displace, and stretch the polypropylene fibers (Reference Numeral 58) in the pattern bonded polypropylene spunbond fabrics in the X-direction, Y-direction, and Z-direction (Reference Numeral 64, 66, and 68, respectively in FIG. 3). This three dimensional penetration of the roots in the polypropylene sod reinforcement and subsequent high degree of root entanglement with each other and the polypropylene sod reinforcement dramatically increases the strength of sod mats formed with very light weight polypropylene sod reinforcements. It also makes possible the use of second quality polypropylene spunbond fabrics as sod mat reinforcements since minor deviations in fabric weight (within a sheet or between sheets), or fiber size or fabric strength will be compensated for by this root reinforcement and thus, high quality sod mats will result. It also makes possible the use of sod mat reinforcements with polypropylene fabric weights of 0.4 opsy and lower while the lowest weight of commercial REEMAY® polyester spunbond fabrics is 0.55 opsy. This 3 dimensional root penetration of the polypropylene fibers (Article 58) has several other important advantages—easier, faster root penetration and better root entanglement to bond the polypropylene sod reinforcement (Reference Numeral 42) and planting medium (Reference Numeral 44) together. The area ratio of the nonbonded fiber region (Reference 62) to the bonded fiber region (Reference Numeral 60) is preferably large to facilitate this root penetration and entanglement. Together, these advantages translate into excellent production and performance characteristics. In tact, as shown in the examples, excellent sod mats of surprising size and weight were produced with polypropylene spunbond fabrics with very low tear strengths. This unexpected result is because of the excellent root entanglement with themselves and the polypropylene fabric which both distributes the stresses and leads to a surprising level of mutual reinforcement. In mature, transplanted sods (2 or more years) as the roots (Reference Numeral 54) grow and expand, the pattern bonded polypropylene fabric will be stretched and torn in all directions (Reference Numerals 64, 66, and 68) allowing it to more easily be assimilated into the surrounding soil and generally improving environmental friendliness over the REEMAY® sod reinforcement disclosed in U.S. Pat. No. 4,941,282. Other pattern bonded, polyolefin sod reinforcements function in a similar fashion and often possess similar advantages. Pattern bonded, polyolefin nonwoven fabrics with high air permeability as measured by Test Method ASTM D-737-75 at 0.5 inch of water are also preferred as polyolefin sod reinforcements because air permeability is another useful measure of openness of a nonwoven fabric to root penetration and entanglement.

Two preferred types of polyolefin sod reinforcements are normally hydrophobic. Both polyethylene and polypropylene sod reinforcements are hydrophobic. Those skilled in the art are knowledgeable about hydrophilic treatments for both polyethylene and polypropylene fibers. Polypropylene spunbond fabrics are available with hydrophilic treatments. This aids root penetration and plant growth by promoting good root wetting from the polypropylene sod reinforcement. An example of a hydrophilic treatment is plasma treatment. Plasma treatment is accomplished by subjecting the polypropylene spunbond fabric to an atmosphere of an active gas generated by exciting a low pressure oxidizing gas such as oxygen mixed with air, argon, nitrogen, or helium by means of a microwave discharge or high frequency discharge. Another example of a hydrophilic treatment is to apply a surfactant to the polypropylene spunbond fabric such as AEROSOL® surfactants marked by American Cyanamid in Wayne, N.J. Other surfactants are common in the industry and may also be used. Another example of a hydrophilic treatment is the addition of wetting or rewetting agent to the polymer melt, fibers, or fabric during or after manufacture of the polypropylene spunbond fabric to increase wettability. ICI (Wilmington, Del.) manufactures nonionic wetting agents for polymer melt and fabric surface applications under the trade name ATMER®. Another example of a wetting agent is WETAID® marketed by C. H. Patrick & Co., Inc. in Greenville, S.C. Surfactants, wetting, and rewetting agents may be polymeric. Still another hydrophilic treatment includes bonding a second layer of wettable fibrous material to the polypropylene spunbond fabric such as a layer of wettable melt blown microfibers of polypropylene which are treated with a surfactant. Thus a hydrophilic treatment is defined in this specification as any treatment to the polyolefin nonwoven fabric, polymer melt, its synthetic fibers or the synthetic fabric itself which promotes said fabric wetting and/or promotes easy water penetration of said fabric. A simple screening test is called the Eye Dropper Test. To determine if a particular hydrophilic treatment promotes wetting and/or easy water penetration in a polyolefin nonwoven fabric by the Eye Dropper Test, cover the top of a ordinary kitchen water glass with a polyolefin nonwoven fabric containing a hydrophilic treatment with a slight concave depression in the middle and secure said polyolefin nonwoven fabric in place with an ordinary rubber band. The eye dropper is selected such that the average weight of a drop of water is from 0.045 to 0.055 grams per drop. Now add carefully twenty drops of water from an eye dropper into the concave depression formed in the hydrophilically treated polyolefin nonwoven fabric supported by the glass. If the drops of water penetrate and/or wet the hydrophilically treated polyolefin nonwoven fabric within 2 minutes, the nonwoven fabric contains a hydrophilic treatment within Eye Dropper Test of this specification. Hydrophilic treatments which have long useful lives are preferred and are known to those skilled in the art.

Further representative examples of hydrophilic treatments for polyolefins and their use are included in U.S. Patents by Schmaltz (U.S. Pat. No. 5,045,387), Harrington (U.S. Pat. No. 5,033,172), Cook (U.S. Pat. No. 4,753,843), Braun (U.S. Pat. No. 4,753,834), Komatsu (U.S. Pat. No. 4,743,494), Sawyer (U.S. Pat. No. 4,578,414), and Wahlquist (U.S. Pat. No. 4,379,192) and are included by reference in this specification. An example of polypropylene nonwoven fabric with a hydrophilic treatment is POLY-BOND® by Polybond Incorporated in Charlotte, N.C.

Since polyolefin and in particular polypropylene will normally degrade if no ultraviolet light stabilizers are added, polypropylene spunbond fabrics often have the additional advantage of being photodegradable. Commercially available REEMAY® polyester spunbond fabrics (disclosed in Milstein U.S. Pat. No. 4,941,282) contain ultraviolet light stabilizers and thus, these will not degrade in the sunlight. ACCORD® polypropylene spunbond fabric is an example of polypropylene sod reinforcement which does not have ultraviolet light stabilizers and thus, will degrade if exposed to the sunlight. In addition, there are a number of well known pro-degradants which may be incorporated into the polypropylene fibers which will promote degradation after the sod reinforcement has served its reinforcement purpose at harvest time and thus, improve the general flower sod mat's environmental friendliness. Some examples of pro-degradants include transition metal salts of a type that are soluble in the polymer melt. The term transition metal means an element having greater than 8 and less than 18 electrons in the outer group of the ion. Typical transition metal salts include stearates, oleates, behenates, myristates, erucates, linoleates or napthanates of copper, cesium, zinc, iron, or chromium. Transition metal complexes with acetonylacetates, 8-hydroxyquinolinates, metalammine are also examples of prodegradants. Other examples of pro-degradants include oxides of metals which can exist in more than one valence state such as chromic oxide, manganese dioxide, ferric oxide and cupric oxide. Polymers, which when added to the polypropylene spunbond fabric enhance biodegradation, oxidation, and/or photodegradation of the polypropylene sod reinforcement are also examples of prodegradants. Thus, prodegradants are those materials which when incorporated into the polypropylene spunbond fabric will increase its degradation rate. These pro-degradants are incorporated along with stabilizers such as antioxidants commonly employed in the manufacture of polypropylene fibers (a typical antioxidant is TOPANOL® manufactured by ICI). The types, quantities, and mixtures of the pro-degradants and stabilizers are carefully selected and adjusted by those skilled in the art to develop a polypropylene nonwoven reinforcement which, after the sod mat has been harvested, sold and installed, will degrade by oxidation, exposure to air at composting temperatures (140 degrees Fahrenheit), biodegradation, and/or upon exposure to sunlight at increased rates. Water soluble stabilizers which will leach from the polypropylene sod reinforcement in the field may also be used. Examples of water leachable stabilizers include lower alkyl (i.e. C1 to C8) substituted thioureas such as trimethyl thioureas, or ethylene thiourea and the like. United States patents offer many detailed examples of the use of pro-degradants and water soluble stabilizers and the preferred types, quantities and mixtures of pro-degradants and stabilizers for polyolefins. Example patents include but are not limited to Newland in U.S. Pat. No. 3,454,510, Kirkpatrick in U.S. Pat. No. 3,795,654, Griffin in U.S. Pat. No. 4,983,651, and Shipp in U.S. Pat. No. 4,818,585 and are included by reference in this specification.

If a grower needs to use a very dense planting medium (Reference Numeral 44), needs to grow seedlings which need a deep planting medium, or needs to harvest the product while it is very wet, or needs a sod reinforcement that is very low weight, or lowest cost, then polyolefin nonwoven sod reinforcements are the best choice. Many applications will also require the different types of degradability and environmental friendliness which polyolefins and in particular, pattern bonded, polypropylene spunbond fabrics incorporating pro-degradants and/or water leachable stabilizers offer. Thus polyolefin and in particular, polypropylene sod reinforcements which contain pro-degradants and/or water leachable stabilizers are often preferred. Pattern bonded polypropylene spunbond fabrics may contain co-filament synthetic fibers wherein one of the synthetic resins is polypropylene or functionalized polypropylene or polypropylene derivative.

For heavy sod mats or sod mats requiring extra strength, hydrophilic treatments to the polyolefin sod reinforcement are preferred. Preferable polyolefin sod reinforcements comprise pattern bonded, polyolefin nonwoven fabrics with a basis weight of less than or equal to about 3 opsy and more preferably a basis weight of less than or equal to about 1.5 opsy and even more preferably a basis weight of less than or equal to about 0.8 opsy and most preferably a basis weight of less than or equal to about 0.3 opsy. Preferably the pattern bonded, polyolefin nonwoven fabric basis weight is greater than about 0.03 and more preferably greater than 0.1 opsy and even more preferably the basis weight is greater than about 0.15 opsy. The preferable area ratios of the nonbonded fiber region to the bonded fiber region is greater than 2/1 and more preferably greater than 4/1 and even more preferably greater than 5/1 and in some special applications, most preferably greater than 15/1. The preferable area ratios are preferably less than about 1000/1 and more preferably less than 100/1 and even more preferably less than about 30/1. Particularly preferable area ratio ranges for general sod mat production are from about 2/1 to 100/1 and more preferably from 4/1 to 30/1. For applications where environmental friendliness are very important, a particularly preferable area ratio range is from 15/1 to 100/1 and even more preferably from 15/1 to 1000/1. A pattern bonded, polyolefin nonwoven fabric with an air permeability of from about 300 to 1500 cfm/sf is preferred and more preferable is an air permeability of from about 500 to 1500 cfm/sf and even more preferable is an air permeability of from about 1000 to 1500 cfm/sf.

Preferable pattern bonded, polypropylene spunbond fabrics range in fabric weight from 3.0 opsy to 0.03 opsy and more preferably from 1.5 opsy to 0.03 opsy and especially preferable from 0.8 opsy to 0.03 opsy. Current sod mat production experience and extrapolations suggest that 0.03 opsy basis will form a useful sod mat. A basis weight of from about 0.4 to 0.2 is currently most efficient to manufacture and thus is often preferred. We expect that these preferred basis weights will drop in the future. The preferable area ratios of the nonbonded fiber region to the bonded fiber region is 2/1 to 1000/1 and more preferably from 4/1 to 1000/1 and most preferably from 5/1 to 1000/1. It is also preferable that the polypropylene sod reinforcement contain a hydrophilic treatment. As higher fabric weights (and strengths) are needed, especially preferable are polypropylene spunbond fabrics with an area ratio of 5/1 to 1000/1 and which contain a hydrophilic treatment.

Figure 4:
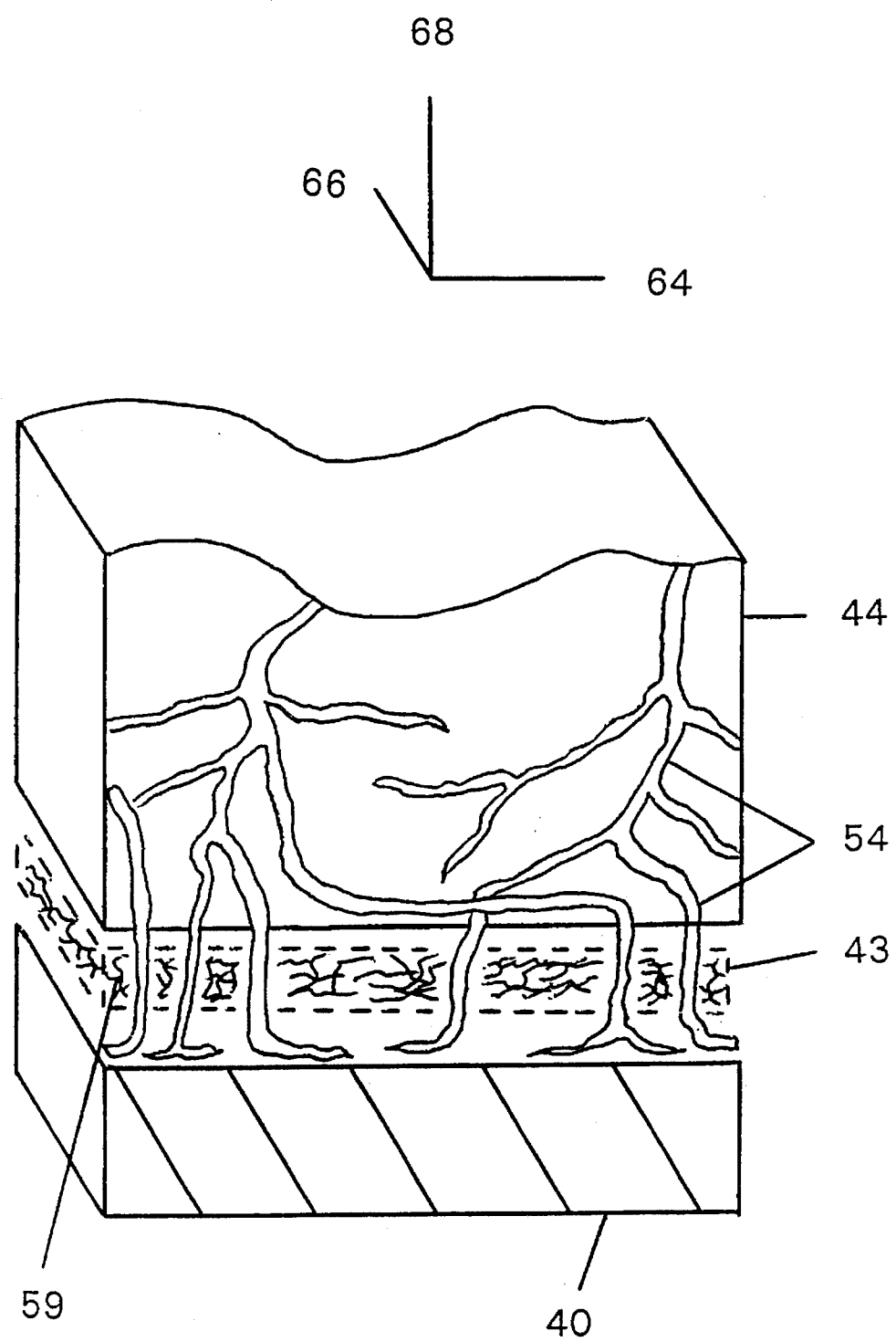
FIG. 4 is an artist's conception of the root penetration in the area bonded, polyester spunbond fabric.

Comparison to Some Prior Spunbond Fabric Sod Mat Reinforcements—FIG. 4

By comparison, Milstein Patent (U.S. Pat. No. 4,941,282) discloses an area bonded, polyester spunbond fabric (REEMAY®). Area bonding refers to fabrics where the fibers in the fabric (for example, Reference Numeral 59 of FIG. 4) are bonded at essentially all fiber junctions (or cross-over points) to each other. Thus the area bonded REEMAY® polyester fabric family of products does not have nonbonded fiber regions which facilitate easy root penetration. In addition, all REEMAY® fabrics are reported to contain ultraviolet light stabilizers and thus will not easily photodegrade. FIG. 4 is an artist's conception of the root penetration in area bonded, polyester spunbond fabrics. As the roots (Reference Numeral 54) penetrate the polyester sod reinforcement (Reference Numeral 43), they must either stretch or break the polyester fibers (Reference Numeral 59) to create a large enough hole in the X-direction and Y-direction (Reference Numerals 64 and 66, respectively in FIG. 4) to grow through. Hence as the roots penetrate the area bonded, polyester fabrics, they generally do so in the Z-direction (Reference Numeral 68). They generally do not tear the polyester sod reinforcement (Reference Numeral 43) in the Z-direction (Reference Numeral 68) because the polyester sod reinforcement (Reference Numeral 43) is so thin and because all fibers are bonded together. By this we mean that the REEMAY® fabric does not generally delaminate into multiple thin layers even with the forces applied by the penetrating roots. Area bonded, polyester spunbond fabrics thus have numerous limitations such as they are not offered in fabric weights (and strengths) as light as pattern bonded, polypropylene spunbond fabrics. REEMAY® is only commercially available with ultraviolet light stabilizers, and at heavier fabric weights they do not offer good sod production characteristics such as good, fast root penetration and entanglement. This limits their versatility and applicability as a sod mat reinforcement as discussed previously. Thus pattern bonded, polyolefin nonwoven fabrics are surprisingly more versatile and lower cost than REEMAY® polyester spunbond fabrics for use as sod mat reinforcements.

A summary table of some typical physical properties of spunbond fabrics disclosed in previous patents (Milstein, U.S. Pat. No. 4,941,282 and Molnar Ser. No. 07/716208) for use in sod reinforcements is shown below:

| Product | Fabric Weight (opsy) | Grab Tensile Strength | | Trap Tear Strength | |
|---|---|---|---|---|---|
| | | (md) (lb) | (td) (lb) | (md) (lb) | (td) (lb) |
| ACCORD ® 104 | 0.4 | 6.0 | 5.8 | 1.6 | 1.2 |
| PBN II ® | 0.3 | 6.0 | 4.0 | 2.9 | 1.8 |
| CEREX ® | 0.4 | 12 | 7 | 5.5 | 3.4 |
| REEMAY ® | 0.55 | 12 | 11 | 4.0 | 4.5 |
| REEMAY ® | 0.6 | 10 | 8 | 4 | 5 | where:
  md=machine direction
  td=transverse direction
  opsy=ounces per square yard
  lb=pound
  Grab Tensile Strength: Test Method ASTM D-1682-64
  Trap Tear Strength: Test Method ASTM D-1117-80
  Air Permeability: Test Method ASTM D-737-75 at 0.5 inch of water PBN II® is nylon spunbond fabric manufactured by Fiberweb, North America, Inc.
  CEREX® is a nylon spunbond fabric manufactured by Fiberweb, North America. Inc.
  REEMAY® is polyester spunbond fabric manufactured by Reemay, Inc.

Further details are included in the respective manufacturer's brochures and included in this specification by reference.

From the very low tear strengths of the ACCORD® polypropylene spunbond fabric in comparison to the PBN II®, CEREX®, or REEMAY® (disclosed in the previously referenced patents), it is surprising that large, heavy sod mats with polypropylene spunbond fabrics can be produced and handled quite easily (see Example 1 of this patent). It is also apparent from the low tear strengths, that less root damage will be caused by the convenient method of hand subdivision of the plant sod mats made with polypropylene spunbond fabrics as compared to those made with nylon or polyester spunbond fabrics. Polypropylene spunbond fabrics have the additional advantage of lower cost than either nylon or polyester spunbond fabrics for the grower (and thus, for the consumer). Polyolefin synthetic resins are also generally lower cost than nylon or polyester resins. Numerous routes are available to render polyolefin synthetics degradable, and hence to improve their environmental friendliness.

It should also be noted that polypropylene spunbond fabrics were first used in light weight seed mats at least 23 years ago in a United States Patent by Franklin (U.S. Pat. No. 3,557,491). McFarland in U.S. Pat. No. 4,786,550 again discloses the use of low weight, pattern bonded polypropylene spunbond fabrics for use in light weight seed mats in 1988. Seed mats are inherently, very light weight. By contrast, plant sod mats are very heavy due to the weight of the wet planting medium and the plants themselves. In looking at the tear strength of the pattern bonded, polypropylene spunbond fabric, we can only assume that others discounted its reinforcement potential for heavy sod mats because of the low tear strengths. Polypropylene netting was used successfully 14 years ago to produce groundcover sod mats (Sterrett el. al., HortScience, 12(5):pg. 492–495, 19977) but these sod mats suffer from the limitations of netting reinforcements in general. Without synergism, the potential of ACCORD® fabrics and other polyolefin nonwoven fabrics to reinforce plant sod mats would be limited. The surprising level of reinforcing synergism between the plant roots and the pattern bonded, polypropylene has gone undeveloped and unrecognized for this 23 year plus time period. It is this synergism and how to produce it which we discovered and developed (and disclosed) which makes polyolefin nonwoven fabrics and, in particular, pattern bonded, polypropylene spunbond fabrics such effective sod mat reinforcements.

Figure 5:
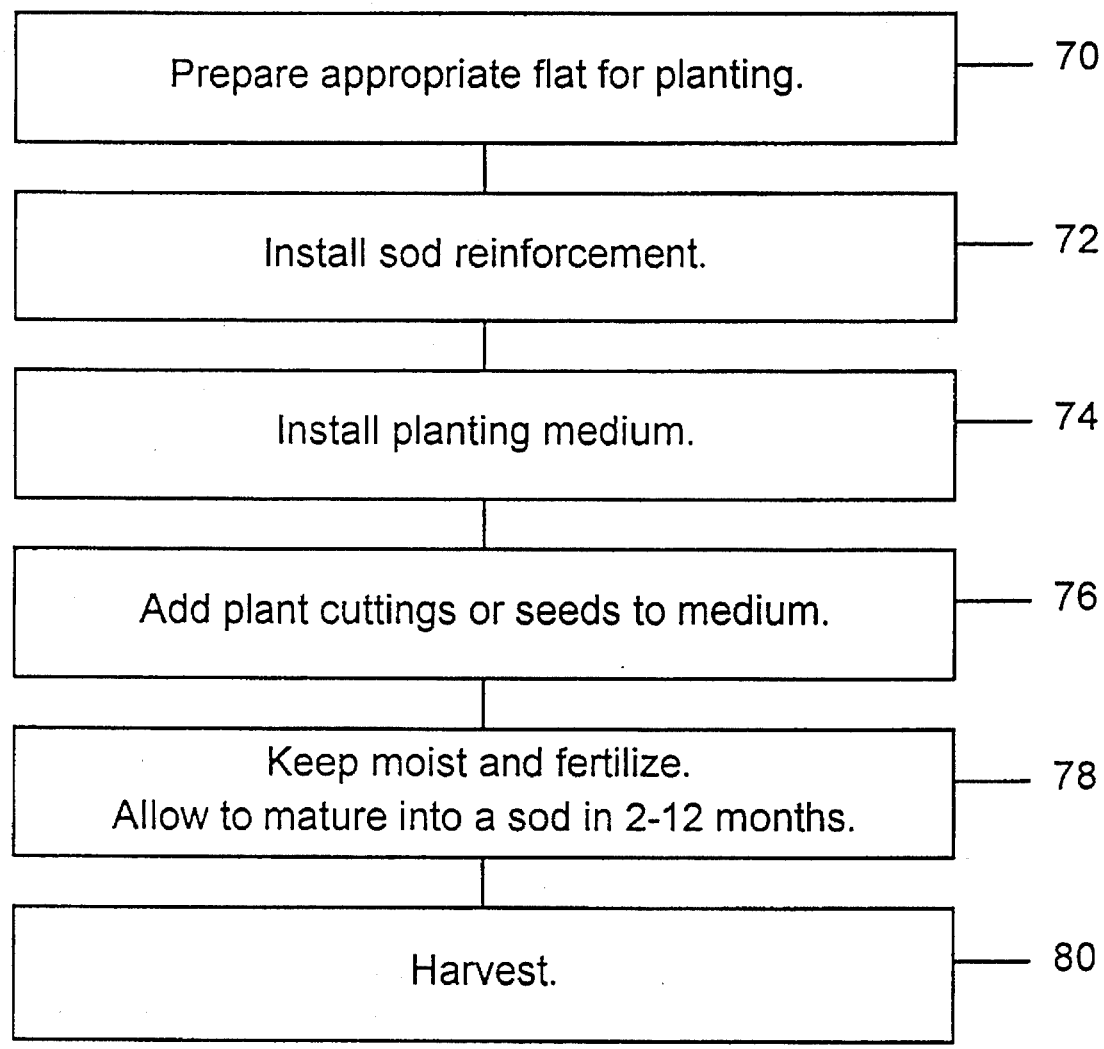
FIG. 5 is a block diagram illustrating the container process of the invention.
Figure 6:
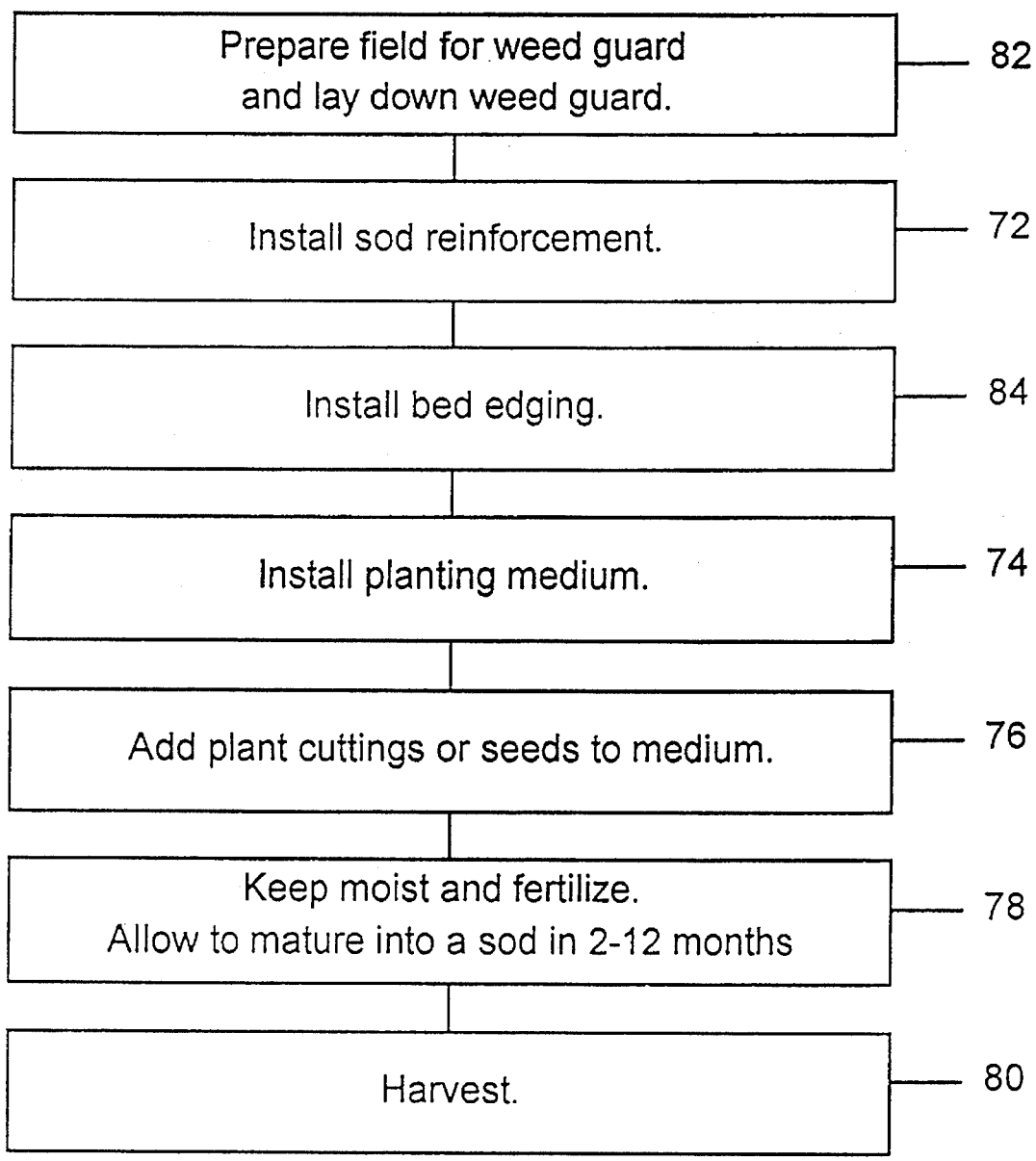
FIG. 6 is a block diagram illustrating a typical field process of the invention.

Process Description (FIGS. 5 and 6)

In FIG. 5, there is shown a block diagram illustrating the general process of growing herb, vegetable, flower, groundcover or plant sod mats in a container according to this invention. The six generalized steps are: (1) the step 70 of selecting an appropriate flat for growing the herb, vegetable, flower, groundcover or plant sod. Generally the flat is from 5–10 cm deep, about 25–40 cm wide and 50–70 cm. long. Size is selected based on the depth the flowers or plants need to grow efficiently and on overall weight. Weight is generally less than 30 kgs. If a bottom suitable for roots to grow on is not inherent in the flat design, a separate layer of plastic film (such as VISPORE® or one of numerous black plastic film mulches) is installed on the bottom. The plastic film then becomes Reference Numeral 40 and serves to contain the sod mat roots which penetrate the spunbond fabric installed in the next step. The plastic film also makes removing the sod mat at harvest time easier in many cases. If used, porous plastic films are generally preferred for flats. (2) the step 72 consists of installing the polypropylene sod reinforcement (Reference Numeral 42) on this plastic film or bottom of the flat (Reference Numeral 40). (3) step 74 consists of selecting and installing the planting medium (Reference Numeral 44) to the depth required of the herb, vegetable, groundcover, flower or plant species. (4) step 76 consists of adding the seeds, seedlings, plant plugs, rooted cuttings, or root divisions (Reference Numeral 48) of the desired species to the planting medium (Reference Numeral 44). (5) step 78 consists of normal feeding and care of the seeds, seedlings, rooted cuttings, root divisions or plant plugs (Reference Numeral 48) for maximum growth. Examples include maintaining proper moisture, shade, fertilizer, and soil amendments. MIRACLE-GROW® manufactured by Stern's MIRACLE-GROW® Products, Inc. in Port Washington, N.Y. is a good fertilizer when applied according to directions. One needs to take care not to over or underwater the medium. A flat which drains and uses porous polyethylene is often advantageous. (6) step 80 consists of harvesting the sod by removing the sod mat from the flat and selling as an herb, vegetable, groundcover, flower or plant sod mat. If a plastic film was used in the flat, it is also remover from the sod mat before final planting.

FIG. 6 is a block diagram illustrating the general process for growing groundcover or flower mats in a field according to this invention. The seven general steps are: (1) Step 82 consists of preparing the field beds by tilling the soil, removing any major weeds left, and then grade and smooth out. Lay down a plastic weed guard barrier such as 4 mil black polyethylene film or suitable porous polyethylene film (Reference Numeral 40). Usually the solid polyethylene film is preferred for field grown applications. In certain circumstances, herbicides may also be used to keep down the weeds. Normally, rows 8 ft. wide by 100–200 ft. long are used. Aisles 3 ft. wide are left between the rows for access and are mulched heavily with wood chips to prevent weed growth. Common geotextiles can also be used to reduce weeds. (2) in step 72 the polypropylene sod reinforcement (Reference Numeral 42) is laid on top of the plastic film (Reference Numeral 40 shown in the preceding FIG. 1). (3) step 84 consists of installing a raised bed railing of 4" by 4" rot resistant treated lumber to contain the planting medium (Reference Numeral 44) and prevent weed encroachment on the planting beds. (4) step 74 consists of selecting and laying the planting medium (Reference Numeral 44) down to the preferred planting depth for the specific plants. Examples include 5 cm deep for liriope spicata, 5 cm deep for houttuynia, 2.5 cm deep for aegopodium, 2.5 cm for creeping phlox and 2.5 cm for thyme. An example of a growing medium is a mixture of 95– 60% FAIRGROW® manufactured by Delaware Solid Waste Authority in Wilmington, Del. and 5–40% demolition wood chips manufactured by Corrado American in Wilmington, Del. (5) step 76 consists of adding the seeds, seedlings, plant plugs, rooted cuttings or root divisions (Reference Numeral 44). Liriope is generally planted on a 10 cm grid pattern and ivy is planted on a 25 cm grid pattern. Alternately, a wildflower seed mix has been applied at 0.2–2 lbs per 1000 square feet depending on application and specific mix. (6) step 78 consists of normal feeding and care of the plant species including such items as appropriate levels of shade, moisture, fertilizer, and soil amendments to assure good germination of the seeds and growth of the plant plugs, rooted cuttings, root divisions, seedlings or germinated seeds. Automated irrigation systems marketed by Buckner, Inc., manufactured in Fresno, Calif. work well for this purpose. If desired for environmental control reasons, common crop covers (Reference Numeral 50) such as REEMAY® 2006 or hay may also be used in the fall to help protect from snow, wind and frost damage. In general, allow sod to mature for 2–12 months. Some sods may mature some what earlier and some sods, some what later. For these sod mats, a range of from 1–18 months is preferred. For some (7) step 80 consists of harvesting the sod mats. The sod mats may be harvested in rectangles of generally 25 to 40 cm by 40 cm to 100 cm. The dimensions usually are adjusted to keep the sod rectangle between 5 and 35 kgs. Alternately with many plants, the sod mats may be rolled up on 3" or 4" Schedule 40 PVC plumbing pipe in widths of 4'. Generally, sods less than 3 cm thick can be harvested in rolls. The plastic film (Reference Numeral 40) is removed sometime before final planting.

EXAMPLES

The following experimental examples will serve to further explain the invention and demonstrate the advantages which are attributable thereto. These examples are not meant to limit sod mats useful in this invention, but only to serve as helpful guidance to those skilled in the art to understand how one might practice some of the preferred embodiments of this invention.

EXAMPLE 1

A custom flower mix A 1 was prepared with the following species: white yarrow (1%), New England Aster (2%), Bachelor's button (4%), Ox-eye daisy (5%), lance-leaf coreopsis (10%), plains coreopsis (2%), cosmos (17%), purple cornflower (12%), firewheel (10%), Dame's rocket (8%), scarlet flax (15%), blue flax (8%), horse mint (3%), corn poppy (1%), and black-eyed Susan (2%), using a formula o given in the National Wildflower Research Center's Handbook, available from the National Wildflower Research Center, Austin, Tex. The percentages by weight of each species is given in parenthesis. Seeding rate was 1.5 lb. per 1000 square feet for Examples 1–3.

Using the sod mat propagation technique illustrated in FIG. 6, this Mix A1 was propagated in a field containing 2.5 cm of a 70/30 volume/volume mixture of FAIRGROW®/woodchips using ACCORD® 0.4 opsy weight as the sod reinforcement. The medium was kept uniformly moist and fertilized with MIRACLE-GROW® at a concentration of one half teaspoon per gallon once every two weeks. The following results were obtained:

| Time (days) | Observations and results |
| --- | --- |
| 17 | Excellent root penetration through the ACCORD ® is apparent. |
| 31 | Excellent root penetration through the ACCORD ® is apparent and good root mat is forming below the ACCORD ® reinforcement. |
| 80 | Sod mat was transplanted and prospered. |

At 59 days a wildflower sod mat measuring 16" by 38" grown was harvested and weighed 22 lbs. This sod mat was lifted at one end with two hands and carried around several times to assure useful sod mat strength. The ACCORD® reinforced sod mat was then replaced in the field and watered for three more days. It looked excellent. It was then lifted again with two hands. By selecting an end area with high root density, the sod could even be lifted with one hand. Because of variances in watering, the sod weighed 20 lbs for this second test.

An identical piece of unused ACCORD® 104 (size 16" by 38") was then taped with fabric duct tape on both sides of one end for reinforcement. This taped end was then attached to a salt treated wooden four by four about 24" long by screwing a piece of wood lattice over the taped region and into said four by four. This weighed 9 lbs. Attempts to lift the four by four by holding onto the ACCORD® (at the opposite and unreinforced end) in the same fashion with two hands as the sod was lifted led to repeated tearing of the ACCORD® 104. The ACCORD® attached to the 9 lb salt treated four by four was also tested 3 days later. It repeatedly tore with similar two or one hand lifting attempts.

This demonstrates the excellent root entanglement with themselves and the sod mat and the surprising extent of the mutual reinforcement in this sample. Of course, the ultimate strength of the harvested sod mat depends on the extent of root development, root strength and root entanglement. Longer time to harvest can also o lead to greater sod mat strengths at harvest times (Of course, stronger polypropylene sod reinforcements can also be used for early harvests).

It will also be noted that the cosmos was quite large and external support was useful. After many tests it appears that cosmos may do better with 4.0–5.0 cm of planting medium.

EXAMPLE 2

Using the sod mat propagation technique illustrated in FIG. 5, this Mix A1 was propagated in a flat containing 2.5 cm of a 70/30 volume/volume mixture of FAIRGROW®/woodchips using ACCORD® 0.8 opsy weight as the sod reinforcement. The medium was kept uniformly moist and fertilized with MIRACLE-GROW® at a concentration of one half teaspoon per gallon once every two weeks. The following results were obtained:

| Time (days) | Observations and results |
| --- | --- |
| 17 | Good root penetration through the ACCORD ® is apparent. |
| 31 | Good root penetration through the ACCORD ® is apparent. |
| 100 | Sod mat was transplanted and prospered. |

EXAMPLE 3

Using the sod mat propagation technique illustrated in FIG. 5, this Mix A1 was propagated in a flat containing 2.5 cm of 70/30 volume/volume mixture of FAIRGROW® woodchips using POLY-BOND® 0.5 opsy weight which contained a hydrophilic treatment as the sod reinforcement. The medium was kept uniformly moist and fertilized with MIRACLE-GRO® at a concentration of one half teaspoon per gallon once every two weeks.
The following results were obtained:

| Time (days) | Observations and results |
| --- | --- |
| 17 | Good root penetration through the POLY-BOND ® is apparent. |
| 31 | Good root penetration through the POLY-BOND ® is apparent. |
| 100 | Sod mat was transplanted and prospered. |

EXAMPLE 4

Using the sod mat propagation technique illustrated in FIG. 5, houttuynia plugs were added to a flat containing 4 cm of a 70/30 volume/volume mixture of FAIRGROW®/woodchips and a N-SULATE® 1.5 opsy pattern bonded, polypropylene nonwoven fabric (N-SULATE® is manufactured by Dewitt). The houttuynia was watered and fertilized for 10 months. A healthy sod mat was then harvested from the flat.

EXAMPLE 5

Using the sod mat propagation technique illustrated in FIG. 5, cherry tomato seeds were planted in a flat containing 2.5 cm of a commercial soilless potting medium REDI-EARTH® and an ACCORD® 0.4 opsy reinforcement. The cherry tomatoes were watered and fertilized for two months. A useful sod mat was then harvested from the flat.

EXAMPLE 6

Using the sod mat propagation technique similar to that illustrated in FIG. 6, a sod mat of wildflower Mix A1 was planted in a 70/30 mixture of FAIRGROW®/woodchips and using a pattern bonded, linear low density polyethylene spunbonded fabric with a basis weight of 0.4 opsy. The area ratio of the nonbonded fibers to the bonded fibers was 8/1. The sod was watered and fertilized for 8 months. A useful sod was then harvested.

EXAMPLE 7

Using the sod mat propagation technique similar to that illustrated in FIG. 6, a sod mat of wildflower Mix A1 was planted in a 70/30 mixture of FAIRGROW®/woodchips and using LUTRASIL® 6710, a pattern bonded, polypropylene spunbond fabric with a basis weight of 0.3 opsy. LUTRASIL® is available from Freudenberg in Durham, N.C. The sod was watered and fertilized for 8 months. A useful sod was then harvested.

EXAMPLE 8

Using the sod mat propagation technique similar to that illustrated in FIG. 6, a sod mat of tall rescue grass was planted in a 70/30 mixture of FAIRGROW®/woodchips and using LUTRASIL® 6710, a pattern bonded, polypropylene spunbonded fabric with a basis weight of 0.3 opsy. The sod was watered and fertilized to 6 months. A useful sod was then harvested.

EXAMPLE 9

Using the sod mat propagation technique illustrated in FIG. 6, cosmos bipinnatus was propagated in a flat containing 2.5 cm of 70/30 volume/volume mixture of FAIRGROW® woodchips using POLY-BOND® with a basis weight of 3 opsy on 4 mil polyethylene film. The medium was kept uniformly moist and fertilized with MIRACLE-GRO® per recommendations. The following results were obtained:

| Time (days) | Observations and results |
|---|---|
| 24 | Good root penetration apparent. |
| 35 | Good root penetration apparent. |

COMPARATIVE EXAMPLE 10

Using the sod mat propagation technique illustrated in FIG. 6, cosmos bipinnatus was propagated in a flat containing 2.5 cm of 70/30 volume/volume mixture of FAIRGROW®/woodchips using REEMAY® 2033 with a basis weight of 3 opsy on 4 mil polyethylene film. The medium was kept uniformly moist and fertilized with MIRACLE-GRO® per recommendations. The following results were obtained:

| Time (days) | Observations and results |
|---|---|
| 24 | No root penetration apparent. |
| 35 | No root penetration apparent. |

By comparing the root penetration rate in Example 9 with the root penetration rate in this Comparative Example 10, it is apparent that the sod mat production is much faster and n-lore economical with a heavy weight pattern bonded, polyolefin nonwoven fabric as compared to this heavy weight REEMAY® polyester nonwoven fabric.

SUMMARY, RAMIFICATIONS, AND SCOPE

Accordingly, the reader will see that this invention can be used to economically and flexibly produce custom, high quality plant sod mats for the grower, landscaper and final customer. Many unique advantages are made available to these customers with this invention, such as excellent root penetration and entanglement, low equipment costs, economical small volume production costs, and high quality sod mats of many different herbs, vegetables, flowers and groundcovers. Furthermore multiple soil or soilless mediums are practical because of the unique flexibility of the polyolefin or polypropylene sod reinforcements discovered. Sod mats with viable seedlings, root divisions, rooted cuttings or plant plugs give instant beautification and make installation easier for the landscaper or homeowner. In addition, unique advantages are offered to both environment and customers by reducing packaging waste, reducing synthetic plastic reinforcement consumption, reducing the synthetic reinforcement planted with the sod along with the added advantage of having a reinforcement which will decompose. Useful decomposition can occur from ultraviolet light, biodegradation, and oxidation or a combination of these. The strength of the sod mat is tailored to the grower's and landscaper' s requirements. Very low tear strength polypropylene spunbond fabrics have been shown to make excellent commercial size flower sod mats which are also easily divisible by hand with minimum root damage. The grower receives still more advantages by reducing his need for inventory, storage, disposal and handling costs associated with a complex array of planting pots and flats by using some simple rolls of polyolefin or polypropylene sod reinforcements which serve multiple plant species.

Although the specification and examples contain many specifications, these should not be construed as limiting the scope of the invention, but as merely providing illustrations of selecting some of the presently preferred embodiments of this invention. For example, single species of hard-to-establish wildflowers could be grown under controlled conditions until they were large enough to be "released to the wild," that is, installed to form an instant stand of the desired species. Specialty gardens such as "butterfly gardens," "moonlight gardens" or herb gardens could be sold in a compact, established form, cut up, and easily installed by the customer. Polyolefin nonwoven fabrics which are off specification for many reasons could be used efficiently in this process—even small sizes which may be overlapped and "stitched together" by root penetration. Various known technologies may be combined with this invention such as automating the production of these sod mats for greenhouses, cooling the sod mat to dormancy for storage or shipping purposes, using various commercial soil wetting agents and hydrogels, and using commercial slow release fertilizers. Planting medium treatment agents can effectively be added to the nonwoven sod reinforcements to further simplify and/or improve propagation of modified plant sod mats. Illustrative examples of planting medium treatment agents include moisture absorbers, nutrients and plant growth regulators helpful to propagation. United states patent U.S. Pat. No. 5,139,566 to Zimmerman is a representative example of this technology known to those skilled in the art and is included by reference.

Thus the scope of the invention should be determined by the appended claims and their legal equivalents, rather than by the preferred embodiments and examples given.

We claim:

1. A plant sod mat comprising the following:
   a) a sod reinforcement wherein said sod reinforcement comprises a pattern bonded, polyolefin nonwoven fabric having nonbonded fiber regions and bonded fiber regions;
   b) a layer of planting medium on said sod reinforcement; and
   c) viable plants growing in said planting medium and whose roots penetrate and entangle with said sod reinforcement.

2. A sod mat of claim 1 wherein a substantial majority of said roots which penetrate said sod reinforcement are located within said nonbonded fiber regions.

3. A sod mat of claim 2 wherein said plants comprise garden plants.

4. A sod mat of claim 1 wherein substantially all of said roots which penetrate said sod reinforcement are located within said nonbonded fiber regions.

5. A sod mat of claim 4 wherein said plants comprise grasses.

6. A sod mat of claim 4 wherein said plants comprise garden plants and said sod reinforcement is comprised of polypropylene fibers.

7. A sod mat of claim 4 wherein said plants comprise garden plants and said sod reinforcement is comprised of polyethylene fibers.

8. A sod mat of claim 1 wherein:
   a. said sod reinforcement has an area ratio of the nonbonded fiber region to the bonded fiber region from about 4/1 to 30/1;
   b. said sod reinforcement is comprised of polyethylene fibers and said sod reinforcement has a basis weight of less than 0.8 opsy; and
   c. said plants are garden plants.

9. A sod mat of claim 1 wherein:
   a. said sod reinforcement has an area ratio of the nonbonded fiber region to the bonded fiber region from about 4/1 to 30/1;
   b. said sod reinforcement is comprised of polypropylene fibers and said sod reinforcement has a basis weight of less than 0.8 opsy; and
   c. said plants are garden plants.

10. A sod mat of claim 1 wherein said sod reinforcement has a basis weight of less than about 0.3 opsy.

11. A sod mat of claim 10 wherein said sod reinforcement has an area ratio of the nonbonded fiber region to the bonded fiber region of greater than about 2/1 and said plants comprise garden plants.

12. A sod mat of claim 1 wherein said sod reinforcement has a hydrophilic treatment.

13. A sod mat of claim 1 wherein said sod reinforcement contains an additive selected from the group consisting of pro-degradants and water leachable stabilizers.

14. A sod mat of claim 1 wherein;
   a. said sod reinforcement has a basis weight of less than about 1.5 opsy and said sod reinforcement has an area ratio of the nonbonded fiber region to the bonded fiber region of greater than 4/1; and
   b. said sod reinforcement is comprised of polyethylene fibers.

15. A sod mat of claim 1 wherein;
   a. said sod reinforcement has a basis weight of less than about 1.5 opsy and said sod reinforcement has an area ratio of the nonbonded fiber region to the bonded fiber region of greater than 4/1; and
   b. said sod reinforcement is comprised of propylene fibers.

16. A plant sod mat comprising the following:
   a) a sod reinforcement wherein said sod reinforcement comprises a pattern bonded, polypropylene spunbond fabric having nonbonded fiber regions and bonded fiber regions;
   b) a layer of planting medium on said sod reinforcement; and
   c) viable plants growing in said planting medium and whose roots penetrate and entangle with said sod reinforcement to form said sod mat.

17. A sod mat of claim 16 wherein said sod reinforcement is less than or equal to about 3 opsy.

18. A sod mat of claim 17 wherein a substantial majority of said roots which penetrate said sod reinforcement are located within said nonbonded fiber regions.

19. A sod mat of claim 17 wherein said pattern bonded polypropylene spunbond fabric is less than or equal to about 1.5 opsy and said sod reinforcement has an area ratio of the nonbonded fiber region to the bonded fiber region of greater than or equal to about 2/1.

20. A sod mat of claim 17 wherein said sod reinforcement is less than or equal to about 0.8 opsy and wherein a substantial majority of said roots which penetrate said sod reinforcement are located within said nonbonded fiber regions.

21. A method of propagating a plant sod mat on a sod growing surface comprising:
   a. placing a sod reinforcement over said growing surface wherein said sod reinforcement is comprised of a pattern bonded, polyolefin nonwoven fabric having nonbonded fiber regions and bonded fiber regions;
   b. placing a layer of planting medium on said sod reinforcement;
   c. placing viable plant starting material in contact with said planting medium;

d. watering and nourishing said plant starting material for growth so plant roots penetrate and entangle with said sod reinforcement to form said sod mat.

22. A method of propagating a plant sod mat of claim 21 wherein said watering and nourishing step d comprises growing said starting material so that a substantial majority of said roots penetrating said sod reinforcement are located within said nonbonded fiber regions.

23. A method of propagating a plant sod mat of claim 21 wherein said watering and nourishing step d comprises growing said starting material so that substantially all of said roots penetrating said sod reinforcement are located within said nonbonded fiber regions.

* * * * *